United States Patent
Goebel

(10) Patent No.: US 10,089,233 B2
(45) Date of Patent: Oct. 2, 2018

(54) METHOD OF PARTITIONING A SET-ASSOCIATIVE CACHE IN A COMPUTING PLATFORM

(71) Applicant: GE AVIATION SYSTEMS, LLC, Grand Rapids, MI (US)

(72) Inventor: Christopher John Goebel, Grand Rapids, MI (US)

(73) Assignee: GE Aviation Systems, LLC, Grand Rapids, MI (US)

(*) Notice: Subject to any disclaimer, the term of this patent is extended or adjusted under 35 U.S.C. 154(b) by 49 days.

(21) Appl. No.: 15/152,156

(22) Filed: May 11, 2016

(65) Prior Publication Data

US 2017/0329712 A1    Nov. 16, 2017

(51) Int. Cl.
G06F 12/08       (2016.01)
G06F 12/0864    (2016.01)
G06F 12/0897    (2016.01)

(52) U.S. Cl.
CPC ...... *G06F 12/0864* (2013.01); *G06F 12/0897* (2013.01); *G06F 2212/601* (2013.01)

(58) Field of Classification Search
CPC ............. G06F 12/0864; G06F 12/0897; G06F 2212/601
USPC ........................................ 711/119, 128, 170
See application file for complete search history.

(56) References Cited

U.S. PATENT DOCUMENTS 4,985,829 A    1/1991  Thane et al.
5,875,464 A    2/1999  Kirk
6,295,608 B1   9/2001  Parkes et al.
6,463,509 B1   10/2002 Teoman et al.
6,493,800 B1   12/2002 Blumrich
(Continued)

FOREIGN PATENT DOCUMENTS

CN    1267824 C       8/2006
CN    103279429 A     9/2013
(Continued)

OTHER PUBLICATIONS

Bui, B.D, et al., "Impact of Cache Partitioning on Multi-Tasking Real Time Embedded Systems," 14th IEEE International Conference on Embedded and Real-Time Computing Systems and Applications, pp. 1-10, (Aug. 25-27, 2008).

(Continued)

*Primary Examiner* — Pierre Miche Bataille
(74) *Attorney, Agent, or Firm* — GE Aviation Systems, LLC; William Andes

(57) ABSTRACT

A method of partitioning a set-associative cache for a plurality of software components may comprise identifying a cache height equal to a number of sets in the set-associative cache based on hardware specifications of a computing platform. The method may further comprise determining at least one component demand set of the plurality of software components and dedicating a set in the set-associative cache for the at least one component demand set. The method may further comprise assembling a proportional component sequence of the at least one component demand set having a sequence length equal to an integer submultiple of the cache height. The method may further comprise concatenating assembled proportional component sequences to form a template for mapping a RAM to the dedicated sets in the set-associative cache.

20 Claims, 9 Drawing Sheets

(56) References Cited

U.S. PATENT DOCUMENTS

| | | |
|---|---|---|
| 6,587,937 B1 | 7/2003 | Jensen et al. |
| 7,096,385 B1 | 8/2006 | Fant et al. |
| 7,213,107 B2 | 5/2007 | Fanning |
| 7,254,746 B1 | 8/2007 | Kaushik et al. |
| 7,318,127 B2 | 1/2008 | Hrusecky |
| 7,873,790 B2 | 1/2011 | Bouchou et al. |
| 7,895,261 B2 | 2/2011 | Jones et al. |
| 8,135,909 B2 | 3/2012 | Houki |
| 8,180,964 B1 | 5/2012 | Koh et al. |
| 8,316,368 B2 | 11/2012 | Vestal et al. |
| 8,458,718 B2 | 6/2013 | Hotra et al. |
| 8,489,846 B1 | 7/2013 | Jensen et al. |
| 8,539,038 B2 | 9/2013 | Jones et al. |
| 8,694,747 B2 | 4/2014 | Jegu et al. |
| 8,943,287 B1 | 1/2015 | Miller et al. |
| 2003/0177313 A1* | 9/2003 | Iyer ............... G06F 12/0848 711/129 |
| 2006/0195662 A1 | 8/2006 | Folio |
| 2007/0143546 A1 | 6/2007 | Narad |
| 2010/0068200 A1 | 3/2010 | Hla et al. |
| 2013/0185475 A1 | 7/2013 | Talagala et al. |
| 2013/0262746 A1 | 10/2013 | Srinivasan |
| 2013/0275683 A1 | 10/2013 | Kacevas |
| 2014/0143495 A1* | 5/2014 | Olson ............... G06F 12/0802 711/126 |
| 2014/0173211 A1 | 6/2014 | Loh et al. |
| 2014/0201452 A1 | 7/2014 | Meredith |
| 2015/0026415 A1 | 1/2015 | Clausen et al. |
| 2015/0120994 A1 | 4/2015 | Uttamchandani et al. |
| 2016/0132434 A1* | 5/2016 | Brandt ............... G06F 12/0808 711/122 |
| 2017/0235512 A1* | 8/2017 | Ruchita ............... G06F 3/0632 711/170 |

FOREIGN PATENT DOCUMENTS

| | | |
|---|---|---|
| CN | 102521150 B | 10/2014 |
| FR | 2995705 A1 | 3/2014 |
| WO | 2015/061965 A1 | 5/2015 |

OTHER PUBLICATIONS

Campoy, A.M., et al., "An Algorithm for Deciding Minimal Cache Sizes in Real-Time Systems," Proceedings of the 13th annual conference on Genetic and evolutionary computation, pp. 1163-1169, (Jul. 2011).

Gurumurthy, S., et al., "Comparing the effectiveness of cache-resident tests against cycle-accurate deterministic functional patterns," IEEE International Test Conference (ITC), pp. 1-8, (2014).
Hosogaya, Y., et al., "Performance Evaluation of Parallel Applications on Next Generation Memory Architecture with Power-Aware Paging Method," IEEE International Symposium on Parallel and Distributed Processing, pp. 1-8, (Apr. 2008).
Jin, X. et al., "A Simple Cache Partitioning Approach in a Virtualized Environment," IEEE International Symposium on Parallel and Distributed Processing with Applications, pp. 519-524, (2009).
King, T., "Cache partitioning increases CPU utilization for safety-critical multicore applications," Retrieved from the Internet URL: http://mil-embedded.com/articles/cache-utilization-safety-critical-multicore-applications/?_sm_au_=iVVqFkHjD6PDWW7, on Mar. 12, 2013, pp. 1-8 (May 2018).
Kranitis, N., et al., "Software-based self-testing of embedded processors," IEEE Transactions on Computers, vol. 54, No. 4, pp. 461-475, (Apr. 2005).
King, T., "Managing cache partitioning in multicore processors for certifiable, safety-critical avionics software applications," IEEE/AIAA 33rd Digital Avionics Systems Conference (DASC), pp. 1-3, (Oct. 2014) (Abstract).
Tam, D., et al., "Managing shared L2 caches on Multi-core systems in software", Workshop on the Interaction between Operating Systems and Computer Architecture, pp. 1-8, (Jan. 2007).
Qin, C., et al., "High-speed Inter-Process Communication based on Shared Cache," OSADL Project: Real Time Linux Workshops, Retrieved from the Internet URL: https://www.osadl.org/?id=1114, pp. 2, (Oct. 2011).
Querishi, M.K., et al., "Utility-based cache partitioning: A low overhead, high-performance, runtime mechanism to partition shared caches," 39th Annual IEEE/ACM International Symposium on Microarchitecture, pp. 1-10, (Dec. 2006).
Vanderleest, S.H., "ARINC 653 hypervisor," IEEE/AIAA 29th Digital Avionics Systems Conference (DASC), pp. 3, (Oct. 3-7, 2010) (Abstract).
Zhuge, Q., et al., "Minimizing Access Cost for Multiple Types of Memory Units in Embedded Systems Through Data Allocation and Scheduling," IEEE Transactions on signal processing, vol. 60, No. 6, pp. 3253-3263, (Jun. 2012).
Extended European Search Report and Opinion issued in connection with corresponding EP Application No. 17169438.3 dated Sep. 21, 2017.
Office Action issued in connection with corresponding CA Application No. 2966117 dated Mar. 2, 2018.

* cited by examiner

| Cache | 1MB, 8-way set associative |
|---|---|
| Block size | 16 bytes |
| Cache width | 128 bytes (8-ways * 16 bytes) |
| Cache Height | 8k (1Mb / 128 bytes) |
| Page Size | 4k bytes |
| Page Width | 16 bytes |
| Page Height | 256 (4k/16) |
| # Partitions | 32 (8k height / 256 height) |
| Min partition size | 32k (4k page * 8 ways) |

FIG. 9

METHOD OF PARTITIONING A SET-ASSOCIATIVE CACHE IN A COMPUTING PLATFORM

BACKGROUND OF THE INVENTION

A computer platform with a set-associative cache may experience contention among multiple software components executing on the platform when more than one block of RAM (random access memory) is assigned to a common set of the cache. For example, the hardware of the computer platform may specify that hundreds or thousands of RAM blocks be serially assigned to each cache set, the assignment circling over the cache many times until each block of RAM is assigned. Because RAM is typically allocated to a variety of software components without referencing the RAM/CACHE mapping, contention may result, causing unpredictable performance for a software component such as an application, a task, or a thread. One solution to hardware-caused contention is to increase the number of lines in each set of the cache, each line being capable of holding a block of code or data attempting to utilize that set of cache. However, each set of the cache may still be assigned to multiple blocks of RAM. In particular, some computer platforms, such as integrated modular avionics (IMA) architectures, may have software components that need to operate deterministically and for which contention is a larger problem.

One possible solution to cache contention is to develop custom computer hardware which allows a user to set aside a spatial partition in the cache where a particular software component situated in RAM may be assigned its own region of cache. However, a hardware solution may be prohibitively expensive, particularly for a product having a low volume in the commercial marketplace. Another solution is to allocate a CPU core to one or more software components for which deterministic performance is desired. However, other computer resources, such as one or more caches, may still be shared and cause contention. Still another solution to contention is time multiplexing of the cache among software components. Unfortunately, periodically setting up and tearing down the time partition may slow execution time for a critical software component.

SUMMARY OF THE INVENTION

In one embodiment, there is disclosed a method of partitioning a set-associative cache for a plurality of software components and which may comprise identifying a cache height equal to a number of sets in the set-associative cache based on hardware specifications of a computing platform. The method may further comprise determining at least one component demand set of the plurality of software components and dedicating a set in the set-associative cache for the at least one component demand set. The method may further comprise assembling a proportional component sequence of the at least one component demand set having a sequence length equal to an integer submultiple of the cache height. The method may further comprise concatenating assembled proportional component sequences to form a template for mapping a RAM to the dedicated sets in the set-associative cache, wherein contention in the set-associative cache is reduced during execution of the plurality of software components in the RAM compared to when the template for mapping is not used.

In another aspect, there is disclosed a method of partitioning a set-associative cache for a plurality of software components having a deterministic execution time in an integrated modular avionics (IMA) architecture for an aircraft and which may comprise identifying a cache height equal to a number of sets in the set-associative cache based on hardware specifications of the IMA architecture. The method may further comprise determining at least one component demand set of the plurality of software components and dedicating a set in the set-associative cache for the at least one component demand set. The method may further comprise assembling a proportional component sequence of the at least one component demand set having a sequence length equal to an integer submultiple of the cache height. The method may further comprise concatenating assembled proportional component sequences to form a template for mapping the components executing in a RAM to the dedicated sets in the set-associative cache.

BRIEF DESCRIPTION OF THE DRAWINGS

FIG. 9 illustrates a mapping of software components in a method of partitioning a set-associative cache, in accordance with a fifth embodiment of the present disclosure

DETAILED DESCRIPTION

As may be appreciated, based on the disclosure, there exists a need in the art for a method of partitioning the cache for a software component to minimize contention when software components access the cache. Also, there exists a need in the art for a method of partitioning the cache spatially and using standard off-the-shelf CPUs.

Figure 1:
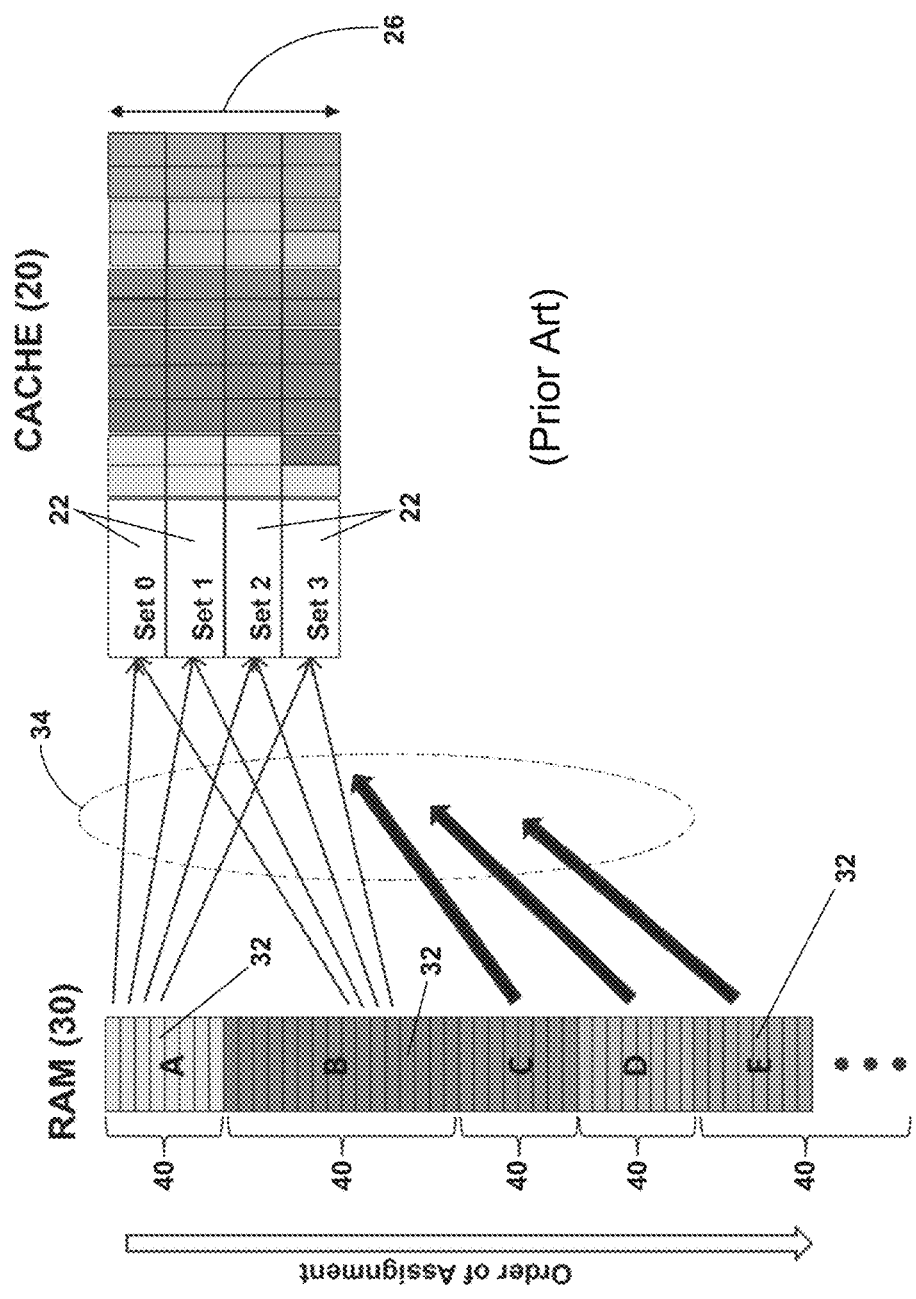
FIG. 1 illustrates a RAM to cache assignment of the prior art.

FIG. 1 depicts a prior art example where software components 40 (A through E) loaded into RAM blocks 32 in a RAM (random access memory) 30 are assigned 34 to a cache 20 according to hardware specifications within a computing platform 12. For example, component A may consist of an application, a task, a thread, or some other software component, and may boot up from a storage device 48 into a substantially contiguous section of RAM 30 ("A" in FIG. 1). A small number of RAM blocks 32 are shown for each software component for convenience and may represent thousands or millions of RAM blocks 32. As part of the boot up process, hardware specifications of computing platform 12 (FIG. 2) may direct a serial assignment 34 of each of a relatively large number of RAM blocks 32 to one of a relatively small number of cache sets 22, circling through the cache until all of blocks 32 have been assigned, regardless of which software component each block 32 belongs to. The cache 20 may be a set-associative cache and may have two, four, eight, sixteen, or some other number of lines 24 (FIG. 4) in each set 22, where each line 24 is capable of storing one block 32 of RAM.

Continuing with FIG. 1, as a result of this automatic assignment process 34, many or all of the software components (A-E) are assigned to every cache set 22 of cache 20, as shown in FIG. 1, providing quick access to code/data frequently used by CPU 14, but also generating a likelihood for contention between booted software components. For simplicity, only four available cache sets are shown here with the cache 20 having a cache height 26 of four. If only a small percentage of each software component 40 needs to occupy space in the cache 20 at any point in time, the probabilities of a conflict between two components assigned to the same cache set may be relatively low. However, given that hundreds of RAM blocks may be assigned to each cache set, the occurrence of contention may be unacceptably high for a software component needing deterministic performance such as a guaranteed maximum execution time. One type of computer platform that may need deterministic performance for a relatively fixed set of critical software components is the integrated modular avionics (IMA) architecture found in avionics systems.

Figure 2:
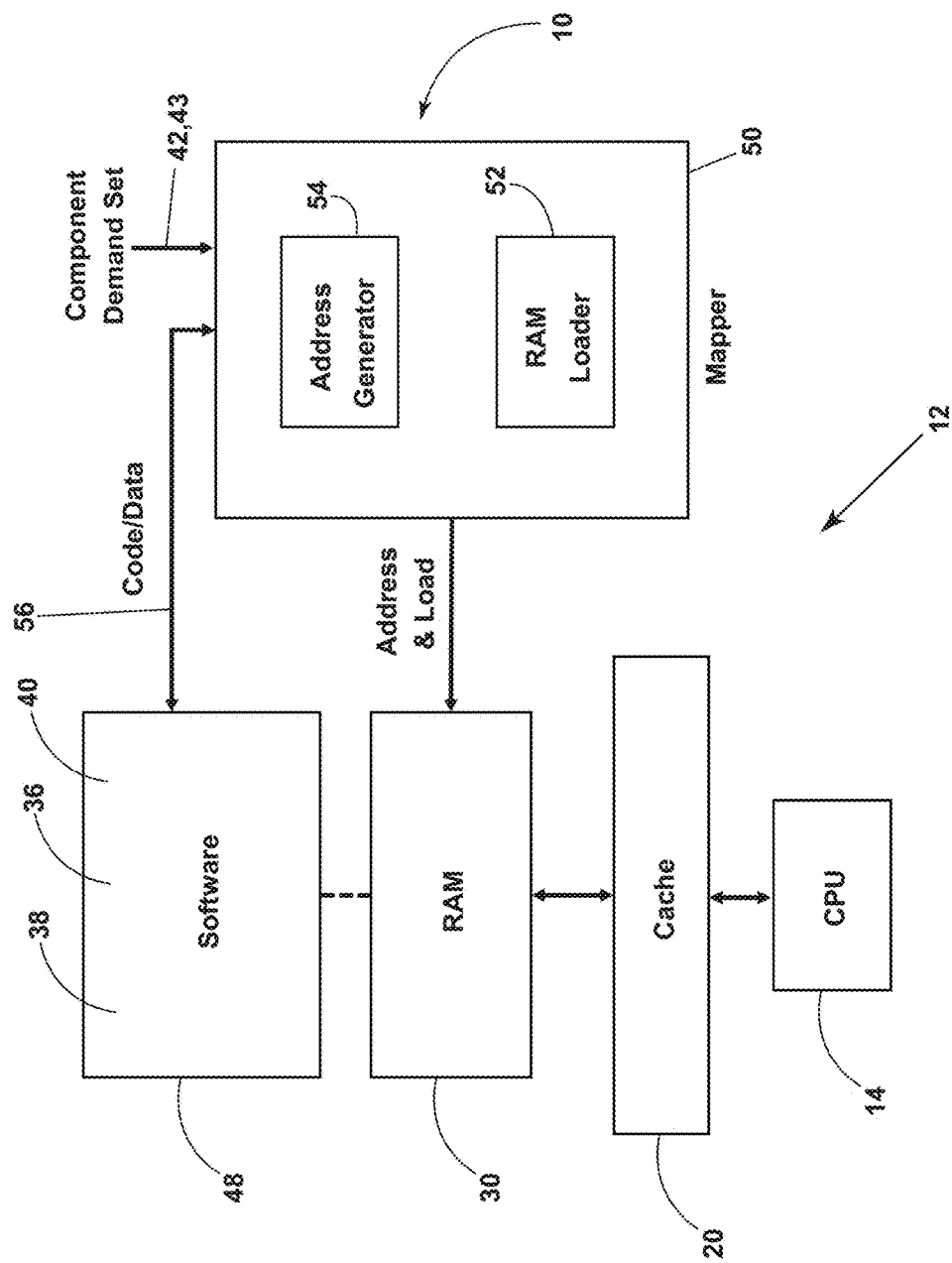
FIG. 2 illustrates an algorithm for a method of partitioning a set-associative cache, in accordance with a first embodiment of the present disclosure.
Figure 3:
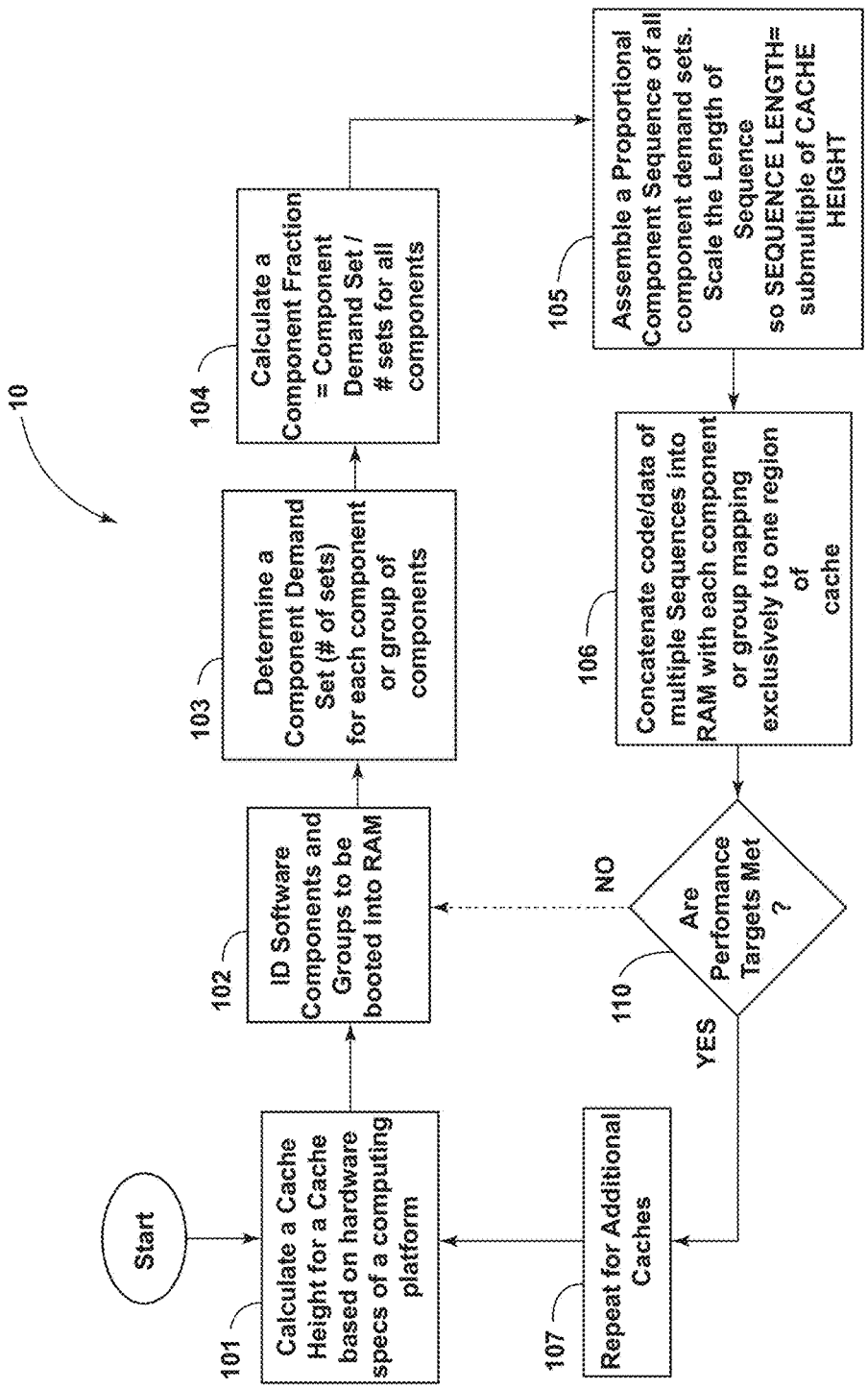
FIG. 3 illustrates a system diagram for a method of partitioning a set-associative cache, in accordance with a generic embodiment of the present disclosure.
Figure 4:
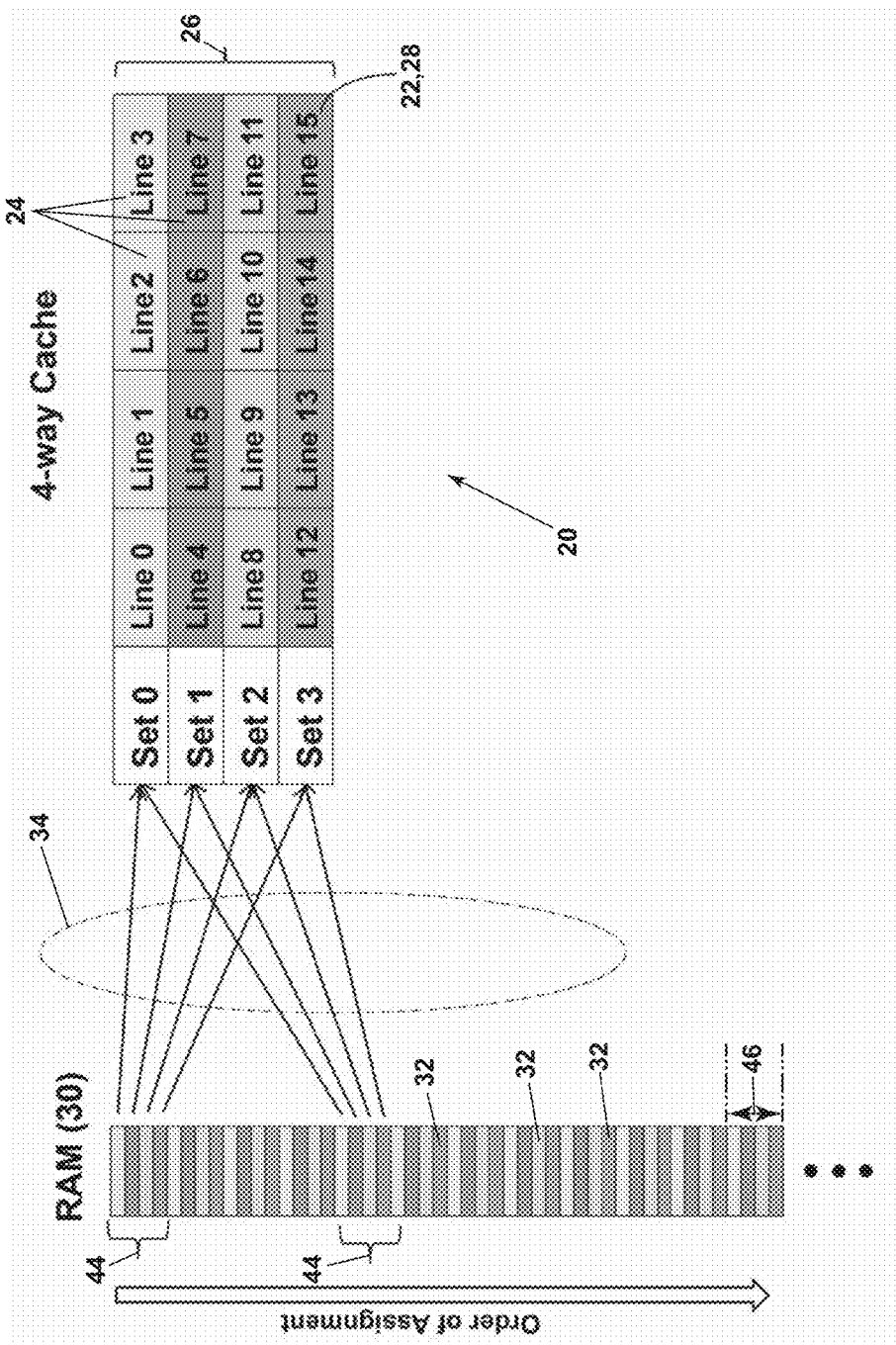
FIG. 4 illustrates a mapping of software components in a method of partitioning a set-associative cache, in accordance with the first embodiment of the present disclosure

Referring now to FIGS. 2-4, in a first embodiment of the present disclosure, a method 10 of partitioning a set-associative cache is described. A computer platform 12 (FIG. 2) may include a component storage device 48 holding a plurality of software components 40 to be loaded into a RAM 30 by a mapper 50 executing partitioning method 10. Cache 20 may be an L1 cache embedded with CPU 14 or may be an L2 cache outboard of CPU 14. In addition, cache 20 may be an L3 cache and which may be shared by two or more CPU cores. Other layers (L) of cache may be utilized. The purpose of partitioning method 10 may be to form a template for mapping software components or groups of components to dedicated sets 28 (FIG. 4) of the set-associative cache 20. In addition, the purpose of partitioning method 10 may be to load a plurality of software components or groups of components into RAM 30 such that cache 20 is spatially partitioned for software components needing deterministic performance. Although the following description is made with respect to one cache and one RAM, the method 10 of partitioning may be repeated for each cache in a multiple-cache computer platform and may apply a template to each RAM assigned to each cache being partitioned. Computer platform 12 may be assumed to assign 34 the RAM 30 to cache sets 22 in the process described above for FIG. 1. Other hardware-based assignments of RAM to cache may be assumed, including a parallel assignment of blocks 32, a grouped assignment, a page assignment, or any other assignment designed to share precious cache resources efficiently with a pool of software components.

Continuing primarily with FIG. 3 while referring also to FIGS. 2 and 4, a first step 101 in partitioning the cache 20 may comprise identifying a cache height 26 equal to a number of sets 22 in set-associative cache 20 based on hardware specifications of the computing platform 12. In the simplified diagram of FIG. 4, the cache height is equal to four and the hardware-based assignment of a RAM block 32 to "Set 3" is followed by an assignment of the next block to "Set 0". In reality, a cache may, for example, have a cache height of 8 k, 128 k, or some other height. A second step 102 in partitioning cache 20 may comprise identifying the software components 40 to be booted into RAM 30 for execution on computer platform 12. Software components 40 may each be a single software component such as a task, an application, a partition, a CPU core, a thread, an operating system, a library, or a Hypervisor. Each software component may also be a group of two or more components which may share a dedicated region 28 of cache. Note a case may occur where a software component not within the plurality of the software components is initialized after boot up of computer platform 12 and after RAM 30 has been loaded. This case of providing a reserved partition will be discussed in later sections of the detailed description and depicted in FIGS. 5 and 6.

A third step 103 in partitioning cache 20, still referring primarily to FIG. 3, may comprise determining a component demand set 42 (FIG. 2) of the plurality of software components identified in step 102 and may comprise dedicating at least one cache set for at the component demand set. The component demand set may comprise a minimum number of cache sets required by a software component or by a group of components to avoid intra-component cache contention for the component or the group. For example, referring to a simplified depiction in FIG. 6, component A may require four sets of cache and component B may require 1 set of cache in order to minimize inter-component contention for software components A and B, respectively. Determining a component demand set for component A may also depend on how much RAM is available to store the code and data for executing component A and may also depend on the number of sets required for other software components to perform well. Dedicating a number of sets for each component may create a proportionality between the various software components being partitioned in the set-associative cache 20. Component demand set 42 may be determined by an algorithm internal to the mapper 50 executing partitioning method 10 and/or may be input by an architect of computer platform 12.

Figure 6:
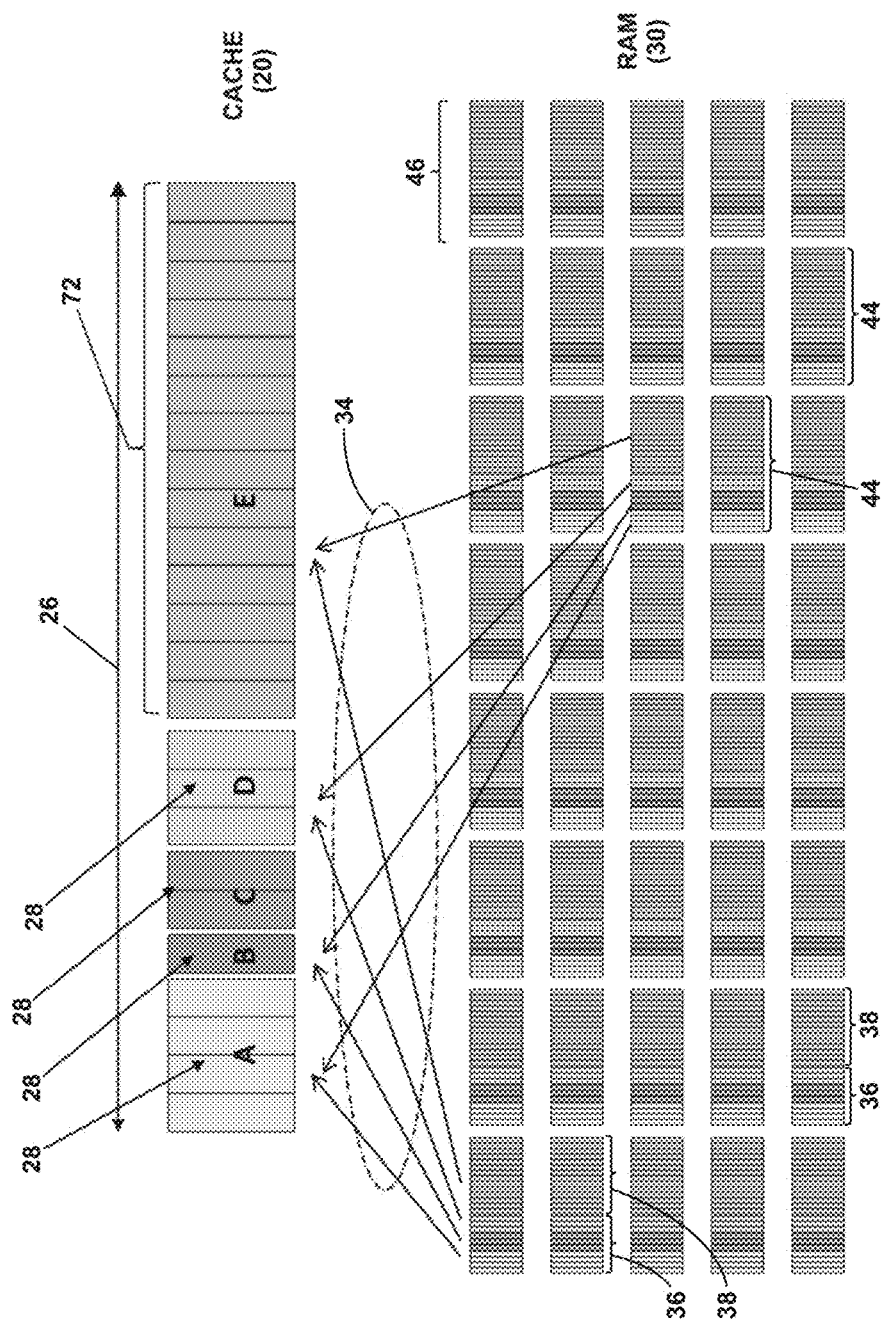
FIG. 6 illustrates a mapping of software components in a method of partitioning a set-associative cache, in accordance with the second embodiment of the present disclosure.

Proceeding with FIG. 3, we may now calculate a component fraction for each component 40, assemble a proportional sequence 44 according to the component demand sets 42, and concatenate the assemble sequences 44 to form a template for mapping the RAM to the dedicated sets 28 of cache 20. First, fourth step 104 may comprise calculating a component fraction for each software component which may comprise dividing a component demand set for each component by the total number of sets dedicated to all of the software components being provisioned in the cache. Next, step 105 may assemble a proportional component sequence 44 of the component demand sets 42, forming a pattern for addressing and loading (FIG. 2) the RAM 30, where the component fractions may determine the proportionality within sequence 44. The sequence 44 may be configured to have a sequence length 46 equal to an integer submultiple of the cache height 26 so that the pattern of RAM blocks 32 of a particular software component 40 are aligned with a location of the dedicated set 28 of cache 20 (FIG. 6). An integer submultiple may be "1" or some other positive integer. Finally, the assembled proportional sequences 44 may be concatenated and which may form a template for mapping the RAM 30 to dedicated sets 28 in set-associative cache 20.

Applying the template for mapping RAM 30 to dedicated sets 28 of cache may eliminate contention in the set-associate cache among the plurality of software components. Additionally, contention in the set-associated cache may include intra-component and/or inter-component contention, and contention may be reduced during execution of the plurality of software components in the RAM by concatenating proportional component sequences as described above, as compared to when the template for mapping is not used. For example, applying the mapping template may eliminate inter-component contention and may permit a minimum amount of intra-component contention to occur depending on the component demand set allocated by an architect. Partitioning the cache for the plurality of software components as described above may provide a deterministic execution time for the software components. For example, applying the mapping template to partition the cache may reduce a cache miss rate to below 0.1 percent, to below 0.01 percent, or to below 0.001 percent for an executing software component that is allocated a dedicated set of cache.

Unlike FIG. 4 which depicts four software components (A-D) each using 25% of the cache and occupying 25% of RAM, FIG. 6 depicts components A-D each having a dedicated set 28 and component E having a large reserve set 72, which is also a dedicated partition of cache.

Referring to FIGS. 2-3 and 6, a partitioning process of the present disclosure may be performed for a second set-associate cache (step 107), and may include identifying software components 40 to be reserved execution space in RAM 30, dedicating a number of sets 28 required by each component 40 to minimize intra-component contention, assembling a proportional component sequence 44 according to the component demand sets 42, adjusting the sequence length 46 to be an integer submultiple of cache height 26 for non-contention between components, and concatenating the sequences of code/data 56 so that each component or group of components 40 operates in a dedicated partition of the cache 20. The code/data 56 of the plurality of software components 40 and the component demand set 42 for each component may be transferred into mapper 50 for carrying out partitioning method 10, where address generator 54 may determine RAM addresses (not shown) according to the template generated by the partitioning method 10. Address generator 54 may be a compiler, a linker, or an equivalent device or process. RAM loader 52 may then load software components 40 into RAM 30 upon initialization of computer platform 12. RAM loader 52 may be a memory management unit (MMU), an operating system, or an equivalent device or process. The assembling of the proportional component sequence 44 may be performed by the MMU of a computing platform 12. Once loaded into RAM, step 110 may measure the performance of the software components to determine if a performance target has been met and may then adjust the proportional component sequence accordingly. For example, a miss rate for each critical software component may be measured to determine compliance with the performance target.

In assembling the proportional component sequence, the number of sets 42 determined for each component may be adjusted upward in size to achieve an integer submultiple relationship between sequence length 46 and cache height 26 and without a penalty to intra-component contention. However, it may be necessary to reduce the number of sets for one or more components in order to achieve an integer submultiple relationship between sequence length 46 and cache height 26, which may penalize intra-component contention for each downsized component. Alternatively, it may be necessary to reduce the number of components 40 loadable into RAM without inter-component contention in order to achieve the individual performance objectives of one or more components. For example, FIG. 6 shows a simplified cache having 24 sets, four of which are dedicated to component A, and which may yield a component fraction of $4/24=1/6^{th}$. The sum of dedicated sets 28 and reserve set 72 may establish a sequence length of twenty-four equal to the cache height of twenty-four for an integer submultiple of one. In an alternative version of FIG. 6 a cache height of forty-eight and a sequence length of twenty-four may produce an integer submultiple relationship of two. In another variation of FIG. 6, the component demands for components A-D may be doubled to improve a performance of A-D and component E may be downsized or removed from the partitioning mapping and the RAM.

Referring to FIG. 6, a penalty of dedicating all of cache 20 according to the proportional component sequence may be that allocating a percentage of the cache to a particular component also allocates the same percentage of RAM for that component's code and data. In other words, a 10% cache allocation for a software component of small size may require that 10% of the RAM be allocated where only 2% is needed, and may result in many empty cells (unusable blocks of RAM). Alternatively, a software component of large size may require 25% of RAM for code/data storage yet may not need the 25% of cache it will be allocated, penalizing other software component's access to cache. One solution to a mismatch between RAM and cache allocation may be to group into one partition a large software component having a low component demand set with a small software component having a high component demand set.

Figure 5:
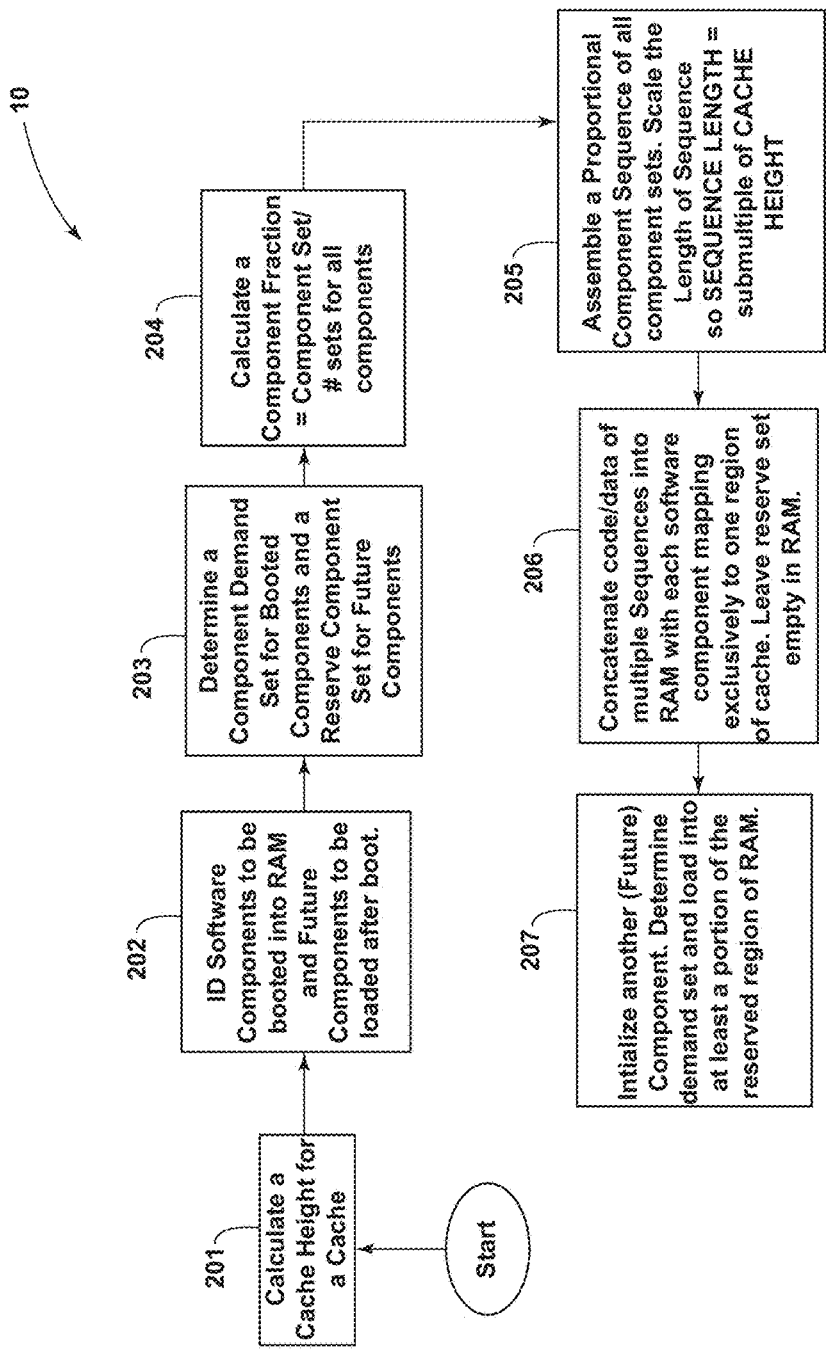
FIG. 5 illustrates an algorithm for a method of partitioning a set-associative cache, in accordance with a second embodiment of the present disclosure.

Referring to FIGS. 5 and 6, a second embodiment of method 10 of partitioning a set-associative cache for a plurality of software components to be loaded into RAM may comprise reserving a set in the set-associative cache for a software component not within the plurality of the software components. Like the algorithm of FIG. 3, a cache height 26 may be calculated from the hardware specifications of computing platform 12 (step 201). In addition to identifying the software components 30, step 202 may distinguish booted components 36 from future components 38 (FIG. 6), where one or more software components may be loaded into RAM after computer platform 12 is operating and where partitioning method 10 maps future components 38 to reserve sets of cache 72. Next, step 203 may determine a component demand set 42 for the booted components 36 and may include determining a reserve demand set 43 (FIG. 2) for future components 38, where the RAM blocks 32 corresponding to future components 38 are not loaded by RAM loader 52 upon initial boot up. One advantage of having reserve set of cache 72 is that it may be partitioned 10 after boot up and according to the particular software components requiring execution. Additionally, multiple components more tolerant of contention may be combined to share the reserve set 72. Further, portions of RAM underutilized by components associated with dedicated sets 28 may be shared by future components 38 if some additional risk to contention for those components might be tolerable.

Continuing with FIGS. 5 and 6, a method 10 of partitioning for future components initiated after boot up may further include the same steps of calculating 204 a component fraction, assembling 205 a proportional component sequence 44 of sequence length 46, and concatenating 206 the assembled proportion component sequences, except that the blocks of RAM 30 corresponding to cache reserve sets 72 will remain empty until there is a request for loading a future component 38 (step 207). As in the first embodiment of FIGS. 3 and 4, a hardware-based serial assignment 34 of RAM to cache is assumed. Additionally, a future component may not refer to a specific component or group of components, but may be a placeholder for components having various sizes and demand sets.

Figure 7:
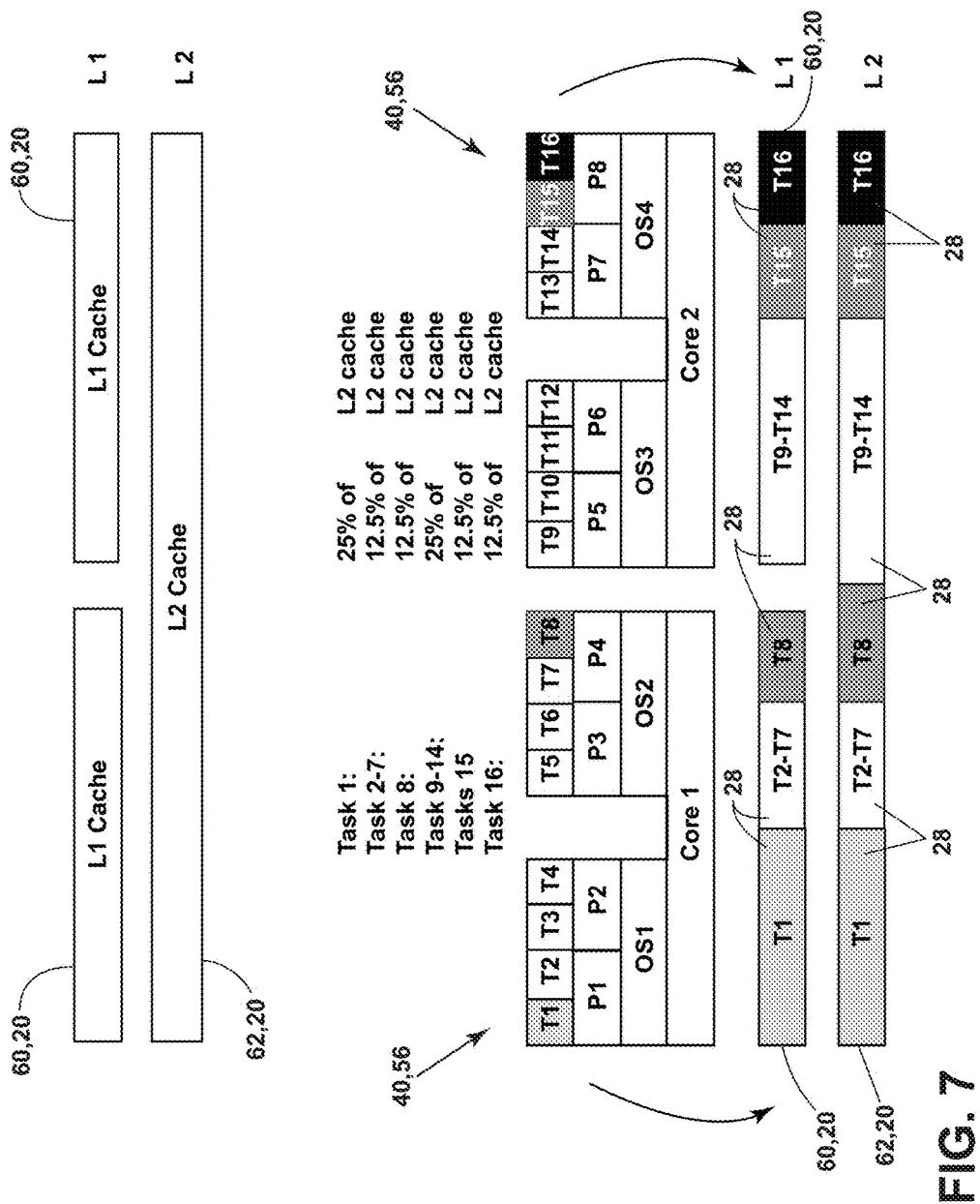
FIG. 7 illustrates a mapping of software components in a method of partitioning a set-associative cache, in accordance with a third embodiment of the present disclosure.

Referring now to FIG. 7, a third embodiment of partitioning method 10 may comprise mapping the code/data 56 of various software components 40 to L1 caches 60 and L2 cache 62. Components 40 are shown in relative size of code/data and may include tasks (T), processes (P), operating systems (OS), and cores. The dimensions of caches L1 and L2 may represent the number of sets 22 available in each cache 20. In this example, a component fraction (tabulated in percentages) may be determined for tasks 1-16 and mapped proportionally to the three caches 20. Note that T1, T8, T15, and T16 may each be given a dedicated set 28, while two groups of components (T2-T7 and T9-T14) may collectively share a dedicated set 28. In this example, a software component 40 may be mapped to two caches (although a RAM is not shown in this figure). However, a cache may not be mapped to two RAM blocks because CPU 14 may not then know which RAM to go to for source code/data. The method 10 of cache partitioning may be the same for any cache in a single or multiple-cache system and may comprise choosing which software components, including future components, for which sets of cache will be dedicated, and may further comprise concatenating proportional sequences of code/data into RAM, where sequence length is an integer submultiple of the cache height.

Figure 8:
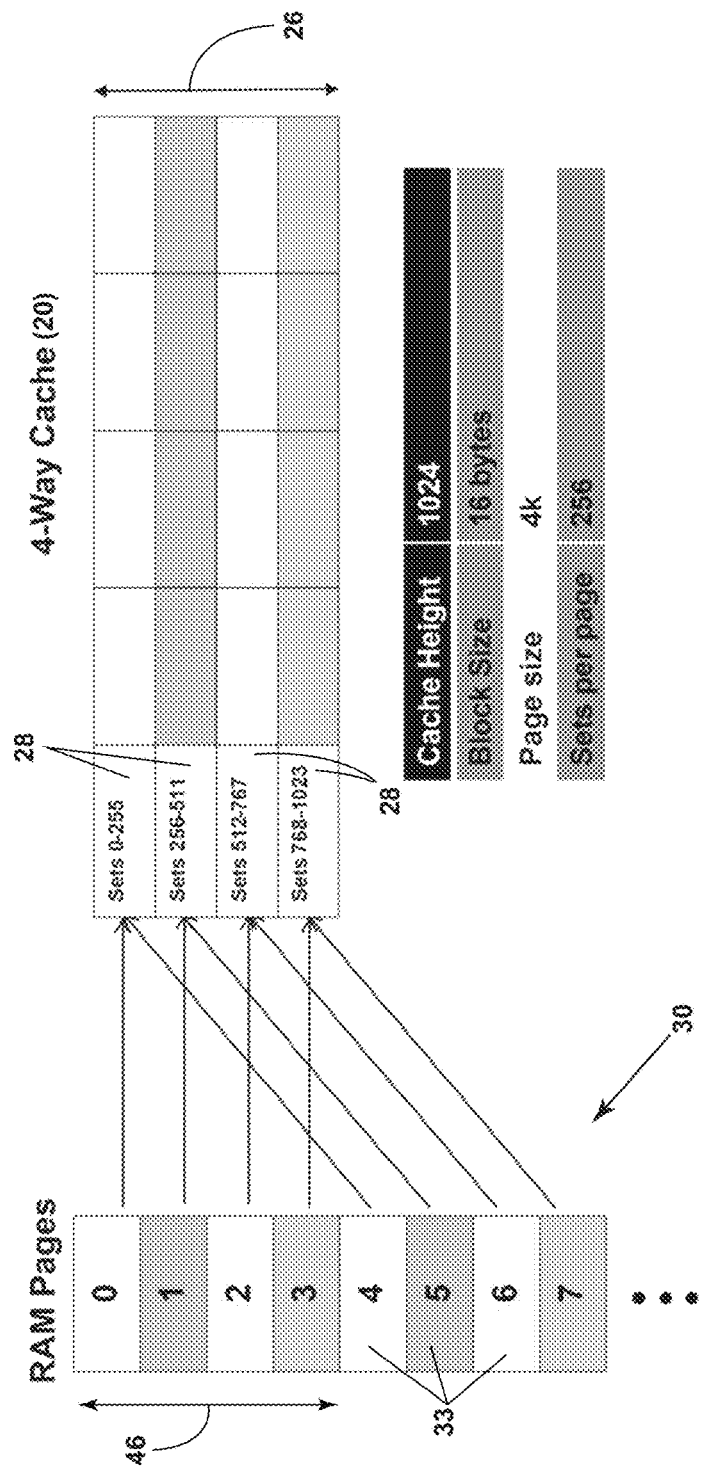
FIG. 8 illustrates a mapping of software components in a method of partitioning a set-associative cache, in accordance with a fourth embodiment of the present disclosure.

Referring now to FIG. 8, a fourth embodiment of partitioning method 10 may comprise organizing code/data 56 into pages 33 of RAM 30, where each page 33 is distinguished by the differently-shaded areas and may each contain portions of one software component. In this example, the hardware-based serial assigning of RAM 30 to cache sets 22 of cache 20 may take place on a page by page basis instead of a block by block 32 basis (FIG. 4). A MMU (not shown) may allocate pages 33 by cache height 26 such that the contents of each page may always map to the same sets of cache. Additionally, the MMU may allow a virtual address used by software applications to remain unchanged.

Referring to FIG. 9, in a fifth embodiment, the proportional component sequence may comprise at least two RAM pages 33 forming a page sequence of sequence length 46 being an integer submultiple of the cache height. This example may demonstrate calculating a mapping of software components stored in pages of RAM to an 8-way set-associative cache. Knowing the size of the cache of 1 MB, the RAM block (cache line) size of 16 bytes, and the number of lines (eight) in a set, one may calculate a cache height of 8 k. Knowing the page height of 256, one may calculate a maximum number of cache partitions available in the RAM as 32.

Many other possible embodiments and configurations in addition to that shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" or "a plurality of" various elements have been described, it will be understood that "a set" or "a plurality" can include any number of the respective elements, including only one element. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. One exemplary application includes a plurality of software components having a deterministic execution time in an integrated modular avionics (IMA) architecture for an aircraft. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of partitioning a set-associative cache for a plurality of software components to be loaded into a random access memory (RAM) of a computing platform, the method comprising:
   identifying a cache height equal to a number of sets in the set-associative cache based on hardware specifications of the computing platform;
   determining, in a mapper, at least one component demand set of the plurality of software components;
   dedicating, in a mapper, a set in the set-associative cache for the at least one component demand set;
   assembling, in a mapper, a proportional component sequence of the at least one component demand set having a sequence length equal to an integer submultiple of the cache height;
   concatenating, in a RAM loader, assembled proportional component sequences to form a template for mapping the RAM to the dedicated sets in the set-associative cache; and
   loading, into the RAM, the assembled proportional component sequences template;
   wherein contention in the set-associative cache is reduced during execution of the plurality of software components in the RAM compared to when the template for mapping is not used.

2. The method of claim 1, wherein the plurality of software components comprises at least one of a task, an application, a partition, a CPU core, a thread, an operating system, a library, or a Hypervisor.

3. The method of claim 1, wherein the assembling of the proportional component sequence is performed by a memory management unit (MMU).

4. The method of claim 1, further comprising reserving a set in the set-associative cache for a software component not within the plurality of software components.

5. The method of claim 1, wherein blocks of the RAM are serially assigned to sets of the cache in an advancing circular fashion according to hardware specifications of the computing platform and regardless of a software content of the blocks.

6. The method of claim 1, further comprising repeating the identifying, determining, dedicating assembling, and concatenating steps for a second set-associative cache.

7. The method of claim 1, wherein the proportional component sequence comprises at least two RAM pages forming a page sequence, a length of the page sequence being an integer submultiple of the cache height.

8. The method of claim 1, wherein the set-associative cache comprises a number of lines per set equal to two or a power of two.

9. The method of claim 1, wherein the set-associative cache is one of L1, L2, or L3 cache.

10. The method of claim 1, further comprising calculating a component fraction equal to the component demand set of each of the plurality of software components divided by a sum of the component demand sets of all of the plurality of software components before assembling a proportional component sequence, where the component fraction determines the proportionality within the proportional component sequence.

11. A method of partitioning a set-associative cache for a plurality of software components having a deterministic execution time in an integrated modular avionics (IMA) architecture for an aircraft, the method comprising:
    identifying a cache height equal to a number of sets in the set-associative cache based on hardware specifications of the IMA architecture;
    determining at least one component demand set of the plurality of software components;
    dedicating a set in the set-associative cache for the at least one component demand set;
    assembling a proportional component sequence of the at least one component demand set having a sequence length equal to a integer submultiple of the cache height;
    concatenating assembled proportional component sequences to form a template for mapping the components executing in a RAM to the dedicated sets in the set-associative cache; and
    loading, into the RAM, the assembled proportional component sequences template.

12. The method of claim 11, wherein contention in the set-associative cache is reduced during execution of the plurality of software components in the IMA architecture compared to when the template for mapping is not used.

13. The method of claim 11, wherein the plurality of software components comprises at least one of a task, an application, a partition, a CPU core, a thread, an operating system, a library, or a Hypervisor.

14. The method of claim 11, wherein the assembling of the proportional component sequence is performed by a memory management unit (MMU).

15. The method of claim 11, further comprising reserving a set in the set-associative cache for a software component not within the plurality of software components.

16. The method of claim 11, wherein blocks of the RAM are serially assigned to sets of the cache in an advancing circular fashion according to hardware specifications of the IMA architecture and regardless of a software content of the blocks.

17. The method of claim 11, further comprising repeating the identifying, determining, dedicating assembling, and concatenating steps for a second set-associative cache.

18. The method of claim 11, wherein the proportional component sequence comprises at least two RAM pages forming a page sequence, a length of the page sequence being an integer submultiple of the cache height.

19. The method of claim 11, wherein the set-associative cache comprises a number of lines per set equal to two or a power of two.

20. The method of claim 11, further comprising calculating a component fraction equal to the component demand set of each of the plurality of software components divided by a sum of the component demand sets of all of the plurality of software components before assembling the proportional component sequence, where the component fraction determines the proportionality within the proportional component sequence.

* * * * *